US010405501B1

(12) United States Patent
Shelor et al.

(10) Patent No.: US 10,405,501 B1
(45) **Date of Patent: *Sep. 10, 2019**

(54) GROWING SYSTEM MIXING BOX WITH $CO_2$ CONTAINING EXHAUST INLET AND COOLING AND HEATING COILS IN SERIES

(71) Applicant: Greenhouse HVAC LLC, Jacksonville, FL (US)

(72) Inventors: F. Mack Shelor, Midlothian, VA (US); Doug Tyger, York, PA (US)

(73) Assignee: Greenhouse HVAC, LLC, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/237,244

(22) Filed: Dec. 31, 2018

Related U.S. Application Data

(63) Continuation-in-part of application No. 15/975,229, filed on May 9, 2018, now Pat. No. 10,165,734.

(51) Int. Cl.

| | |
|---|---|
| ***A01G 9/24*** | (2006.01) |
| ***A01G 9/18*** | (2006.01) |
| ***A01G 9/14*** | (2006.01) |
| ***A01G 9/26*** | (2006.01) |

(52) U.S. Cl.
CPC .............. *A01G 9/246* (2013.01); *A01G 9/14* (2013.01); *A01G 9/18* (2013.01); *A01G 9/26* (2013.01)

(58) Field of Classification Search
CPC .................................. A01G 9/18; A01G 9/24
See application file for complete search history.

(56) References Cited

U.S. PATENT DOCUMENTS

| | | | | |
|---|---|---|---|---|
| 4,567,732 | A | 2/1986 | Landstrom et al. | |
| 4,569,150 | A | 2/1986 | Carlson et al. | |
| 5,299,383 | A | 4/1994 | Takakura et al. | |
| 8,707,617 | B2 | 4/2014 | Houweling | |
| 9,161,498 | B1 | 10/2015 | Shelor | |
| 2004/0194371 | A1 | 10/2004 | Kinnis | |
| 2005/0005529 | A1 * | 1/2005 | Brault | A01G 7/045 52/63 |
| 2012/0260689 | A1 | 10/2012 | Veltkamp | |
| 2017/0099785 | A1 | 4/2017 | Zimmerman et al. | |

* cited by examiner

*Primary Examiner* — Monica L Williams
(74) *Attorney, Agent, or Firm* — Mark Young, P.A.

(57) ABSTRACT

A growing system (e.g., greenhouse) is equipped with a mixing box that features a PLC-controlled cooling coil and a heating coil in series. PLC regulated inputs include air and $CO_2$-containing exhaust. The cooling coils in series facilitate condensation to maintain relative humidity in an acceptable range. Substantial cooling is necessary to achieve sufficient condensation and temperature reduction. Condensate is collected for reuse. The heating coil heats cooled $CO_2$-enriched air to an acceptable temperature for plant health. The output is a temperate low relative humidity $CO_2$-enriched stream optimal for plant health.

20 Claims, 10 Drawing Sheets

GROWING SYSTEM MIXING BOX WITH $CO_2$ CONTAINING EXHAUST INLET AND COOLING AND HEATING COILS IN SERIES

FIELD OF THE INVENTION

This invention relates generally to greenhouses, and, more particularly, to a mixing box for regulating carbon dioxide concentration, relative humidity and temperature of air circulated in a growing system.

BACKGROUND

Plant growth is heavily influenced by the surrounding environmental climatic variables and by the amount of water and fertilizers supplied by irrigation. This is a main reason why a greenhouse is ideal for cultivation, since it constitutes a closed environment in which climatic and fertirrigation variables can be controlled to allow an optimal growth and development of the crop.

Among the climatic conditions are temperature, relative humidity (RH) and $CO_2$ concentration. For optimal growing of many plants, temperature in a growing system (e.g., a greenhouse or other indoor growing environment) should be controllable between 55° F. and 80° F. in the growing space. $CO_2$ concentration in the greenhouse should be controllable between atmospheric levels of 400 ppm and 1,500 ppm. And relative humidity in the space should controllable between 35% RH and 80% RH. Water condensation and recovery from plant transpiration, for healthy plants, will be between 0.2 liters/plant/day and 3 liters/plant/day, depending upon the plant and conditions.

Known greenhouse systems address some of these variables, individually. Some greenhouse systems have been devised to enrich the air with $CO_2$. Others have been devised to heat air when ambient conditions are cold. Others cool air when ambient conditions are hot. If the source of $CO_2$ is natural gas engine or boiler exhaust, it becomes difficult to prevent increases in temperature and water vapor beyond those suitable for plants. High temperature exhaust contains appreciable water vapor as a byproduct of combustion. None of the prior art systems combines heating and cooling to control temperature and relative humidity of a $CO_2$ enriched stream of air while capturing condensate, particular where the source of $CO_2$ is exhaust from a natural gas engine or boiler.

Fungus and bacteria are influenced by humidity and temperature. High humidity inside greenhouses, at least at certain periods of time, favors the formation of fungal spores, accelerating their development, as well as the growth of bacterial colonies, especially if temperatures are favorable. These risks become higher when water vapor condenses on the plants. During daytime, RH decreases in the greenhouse when temperature increases, although the absolute humidity increases due to transpiration. At night, as the greenhouse gets colder, the RH increases and may reach saturation, at which point condensation occurs. Such conditions are ideal for mold and bacteria formation and growth, each of which compromises the health of the plants.

A greenhouse climate management system that allows for simultaneously maintaining a set of climate factors (temperature, humidity, $CO_2$) close to pre-established set point values, respecting certain rules established by a user, is needed. What is needed is a year-round system and method of maintaining the temperature and relative humidity of a $CO_2$ enriched stream of air within acceptable ranges for optimal plant growth in a greenhouse, while capturing appreciable condensate. The system should preferably be efficient, reliable, scalable and adaptable to existing greenhouses. The system should work with $CO_2$ enrichment from exhaust from an engine or boiler that consumes natural gas.

The invention is directed to overcoming one or more of the problems and solving one or more of the needs as set forth above.

SUMMARY OF THE INVENTION

To solve one or more of the problems set forth above, in an exemplary implementation of the invention, a growing system equipped with a mixing box is provided. The mixing box features at least one cooling coils and a heating coil in series. The cooling coil facilitates condensation to maintain relative humidity in an acceptable range. The heating coil heats chilled $CO_2$-enriched air to an acceptable temperature for plant health. Condensate is collected for reuse. Substantial cooling is necessary to achieve sufficient condensation in many environments, especially if moist hot $CO_2$-containing exhaust is introduced into the mixing box. Multiple stages of cooling through a plurality of cooling coils in series may be used. The heating stage is necessary to return the multi-stage cooled $CO_2$-enriched air to an acceptable temperature and relative humidity.

Inputs and outputs from the mixing box are controlled by a PLC or similar digital control system. Controllable valves regulate flow of heated and chilled water or refrigerant to and from heating and cooling coils. Controllable dampers regulate the flow of gases (fresh air, recirculated air and $CO_2$-containing exhaust) to the mixing box. Controllable fans regulate flow across the growing system, and exhaust from the growing system.

An exemplary growing system mixing box according to principles of the invention includes a housing through which gaseous fluids (e.g., air, recirculated air, exhaust containing $CO_2$ from a natural gas fueled engine or boiler) flow. A plurality of inlets (e.g., a fresh air inlet, a $CO_2$-containing exhaust inlet, and a recirculation air inlet) are provided to admit each of the fluids into the housing. An outlet is provided in fluid communication with a growing space that contains plants. The outlet is spaced apart from the plurality of inlets. At least one cooling coil, or a plurality of cooling coils is provided, in series, disposed between the plurality of inlets and the outlet. A heating coil is provided, in series with the plurality of cooling coils, between the plurality of cooling coils and the outlet. The $CO_2$-containing exhaust inlet is fluidly coupled to one of a natural gas engine and a natural gas boiler. Each coil includes an inlet line and an outlet line. A heated or cooled fluid flows through the inlet line, through the coil and out of the coil through the outlet line. Fluids for a cooling coil may be chilled water or a water and glycol (ethylene or propylene glycol) solution. Fluids for a heating coil may comprise heated water or a water and glycol solution. An electrically controlled valve (e.g., modulating valve) controls fluid flow through each inlet line into a coil. There is at least one electrically controlled valve per inlet line. A plurality of dampers are also provided. At least one damper controls flow through each inlet of the plurality of inlets. Each damper is an electrically actuated damper. A plurality of sensors are provided in the growing space. A controller (e.g., a PLC) is operably coupled to each of the valves, dampers and sensors. The sensors provide input to the controller. The sensors include a humidity (e.g., relative humidity) sensor, a $CO_2$ sensor, a temperature sensor and a light sensor. A plurality of setpoints are stored on the controller. The setpoints include daylight and nighttime setpoints for temperature, relative humidity and $CO_2$ concentration. Each setpoint may comprise a range of target values. The controller controls the valves and dampers to maintain output from the humidity sensor, the $CO_2$ sensor, and the temperature sensor within applicable setpoints. Thus, sensed humidity is maintained within the daytime or nighttime humidity setpoint. Similarly, temperature is maintained within the daytime or nighttime temperature setpoint. Likewise, $CO_2$-concentration is maintained within the daytime or nighttime $CO_2$ setpoint.

BRIEF DESCRIPTION OF THE DRAWINGS

The foregoing and other aspects, objects, features and advantages of the invention will become better understood with reference to the following description, appended claims, and accompanying drawings, where:

DETAILED DESCRIPTION

As used herein, a growing system refers to an enclosure in which plants are grown. A greenhouse is an example of such an enclosure. Other types of growing systems are indoor spaces and outbuildings adapted for growing plants, such as *cannabis*. Still, other types of growing systems are containers (e.g., cargo containers) and tents adapted for growing plants. Economy of scale makes the invention particularly well-suited for use in commercial growing systems. The space within a growing system in which plants are grown is a growing space.

While an implementation with two cooling coils in series is described herein, the invention is not limited to an implementation with two or more cooling coils. Rather, the invention may be implemented using one or more cooling coils.

Figure 1:
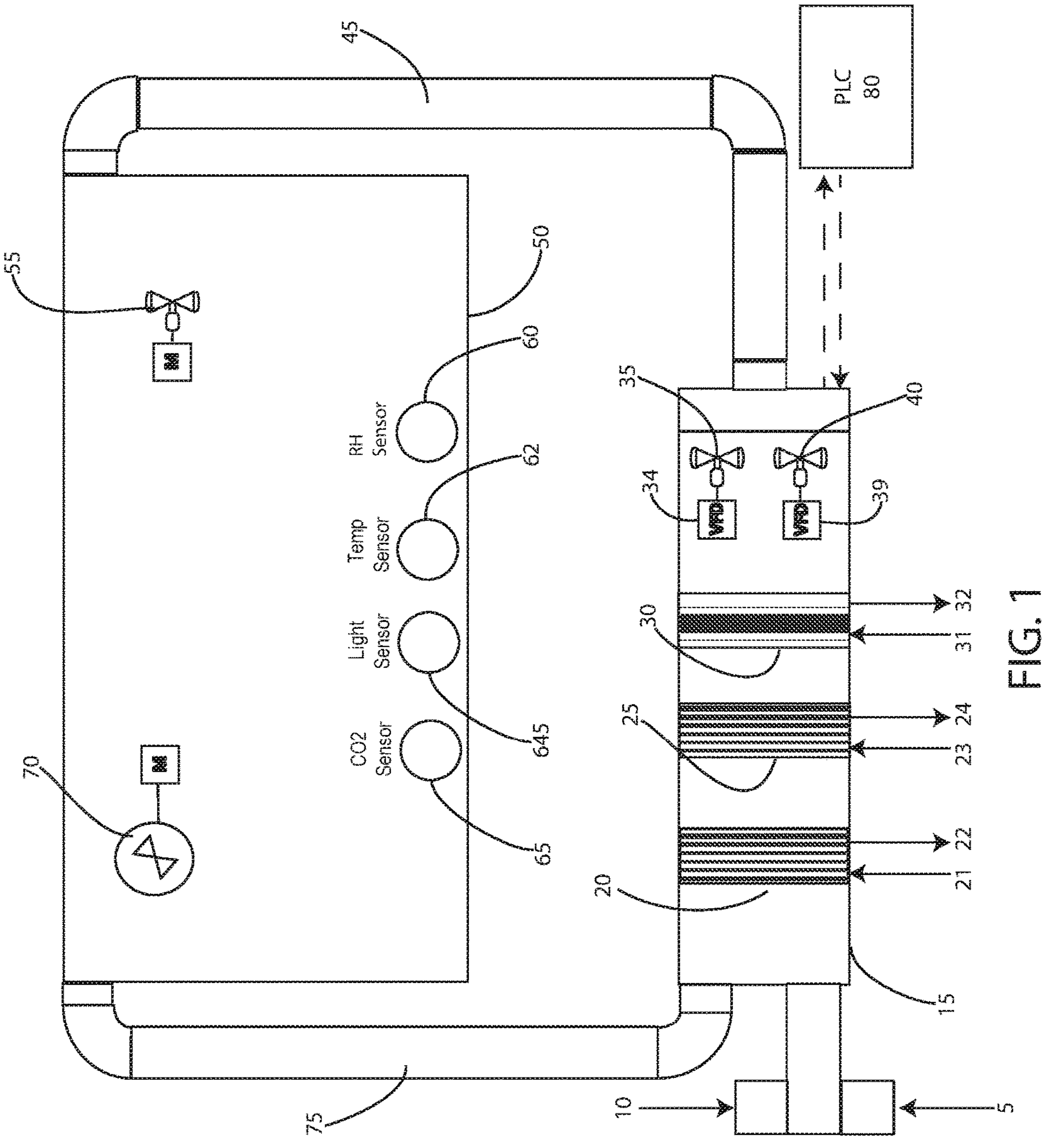
FIG. 1 is a schematic of a greenhouse with an exemplary mixing box according to principles of the invention.

In the exemplary embodiment of FIG. 1, a mixing box 15 according to principles of the invention contains a pair of cooling coils 20, 25, a heating coil 30, and outlet fans 35, 40. The invention does not require two outlet fans 35, 40. One or more outlet fans may be provided. Inlets to the mixing box 15 include a recirculation conduit 75, a fresh (external) air inlet 10, and a $CO_2$ or $CO_2$-containing exhaust inlet 5. An outlet conduit 45 fluidly couples the mixing box 15 to a greenhouse 50. The mixing box 15 supplies temperature and humidity controlled $CO_2$-enriched air to the growing system, such as greenhouse 50. Dampers control flow through conduits 45, 75, and through inlets 5, 10. Valves control flow of heated or cooled liquids through supply and return lines 21, 22; 23, 24 and 31, 32 for the cooling coils 20, 25 and the heating coil 30.

In normal operation, $CO_2$ concentration, lighting, temperature and relative humidity distributed in the greenhouse are measured from sensors 60-65. Measured values are transmitted to a controller, such as a programmable logic controller (PLC) 80, for monitoring and control. The PLC 80 includes analog and digital inputs and outputs, including inputs for receiving signals from sensors and outputs for control signals for flow control elements. The PLC 80 also includes memory and processing circuitry to receive and process inputs, determine appropriate outputs according to a programmed algorithm, and output control signals corresponding to the determined appropriate outputs. The PLC 80 thus controls flow control elements such as dampers, valves and motor controllers, to maintain temperature, relative humidity and $CO_2$ concentration within predetermined ranges for optimal plant growth. The ranges may vary according to plant, season, and time of day. The ranges may be user input values and/or determined from an algorithm and/or from one or more databases of values.

In lieu of a PLC, a microcontroller-based control system may be utilized. Such a control system would be appropriate where many units will be produced, so the development cost (design of power supplies, input/output hardware, and programming) can be spread over many sales, and where the end-user would not need to alter the control.

In one nonlimiting example, the PLC 80 may implement proportional-integral-derivative (PID) control. PID control is a control loop feedback methodology for continuously modulated control. In such an implementation, the PLC 80 continuously or repeatedly calculates an error value, e(t), as the difference between a desired setpoint (SP) and a measured process variable (PV), such as temperature, relative humidity and $CO_2$ concentration, and applies corrections based on proportional, integral, and derivative terms. Thus, the PLC 80 automatically applies accurate and responsive correction to a control function. The correction may take the form of closing, partially closing, opening or partially opening one or more flow control dampers 120, 140, 205, 215, 270 (FIGS. 2 & 3) and/or one or more flow control valves on lines 21, 22, 23, 24, 31, 32. Such dampers and valves may control fluid flow to, through and from the mixing box or components of the mixing box. The correction may also take the form of increasing or decreasing the rate of rotation of one or more motors powering fans 35, 40, 55, 70. Such motors may control flow through a greenhouse, from the mixing box and into the mixing box.

In an exemplary embodiment, the fans 35, 40 in the mixing box and the exhaust (recirculation) fan 70 in the greenhouse are Variable Air Volume (VAV) fans. Plants at different stages of growth will transpire significantly different amounts of moisture. To adapt the mixing box to the widely changing transpiration amounts, the fans may operate over a very large range of air changes in the space. Generally VAV fans may operate over a range of about 20% to 100% of their rated flow. In an exemplary implementation, this could achieve anywhere from 40 air changes per hour in the growing space down to 1 air change per hour in the air space. Where single grow spaces have plants with various stages of growth in the same space, the number of air changes in the space may only require a variability of between 4 air changes and 8 air changes. The amount of moisture that can be removed depends on the amount of air over the coils. With VAV fans, a mixing box according to principles of the invention can adjust volumetric air flow to dehumidify almost any known plant environment.

The PLC 80 is communicatively coupled to input devices, such as an interface or computer for user input and sensors for measuring process variables. In an exemplary embodiment, the sensors include a $CO_2$ sensor 65, a light sensor 64, a temperature sensor 62 and a relative humidity sensor 60. Nonlimiting examples of a $CO_2$ sensor 65 include a non-dispersive infrared (NDIR) $CO_2$ sensor and a chemical $CO_2$ gas sensor with sensitive layers based on polymer- or heteropolysiloxane. Nonlimiting examples of a light sensor include a photodetector, such as a photodiode, charge coupled device, CMOS image sensor, phototransistor, and a photo-voltaic cell. The temperature sensor 62 is a thermostat. Nonlimiting examples include thermostats with bimetallic mechanical or electrical sensors, expanding wax pellets, electronic thermistors and/or semiconductor devices, and electrical thermocouples. Nonlimiting examples of relative humidity sensors 60 are humidistats.

The PLC 80 is operatively coupled to flow control valves (e.g., electrically or pneumatically actuated valves), which control flow of liquid. A solenoid valve is an electromechanically operated valve, and one nonlimiting example of a suitable flow control valve. One or more such valves may control the flow of a heated liquid (e.g., water) to and/or from heating coil 30, via inlet 31 and outlet 32 lines. One or more such valves may control the flow of a cooled fluid (e.g., water or refrigerant) to and/or from cooling coils 20, 25, via inlet 21, 23 and outlet 22, 24 lines.

The PLC 80 is operatively coupled to flow control dampers. Such dampers control flow through recirculation conduit 75, inlets 5, 10, and optionally outlet 45. A damper is a valve or plate that stops or regulates the flow of fluid (primarily gaseous) inside a duct or other handling equipment. A damper may be used to cut off flow or to regulate flow. The dampers are operated by electric or pneumatic motors, solenoids or other actuators or valves controlled by the PLC 80 or another compatible controller. The degree of flow may be calibrated, perhaps according to signals from inputs going to the PLC in order to modulate the flow to effect climate control.

The PLC 80 may also be operatively coupled to motor controllers. The motor controllers may be binary (on/off) controllers or variable speed controllers. Such controllers (e.g., 34, 39) control the output fans 35, 40 of the mixing box 15, thereby controlling volumetric flow rate from the mixing box 15. Similarly, circulation fans 55 and exhaust (return) fans 70 within the greenhouse 50 are controlled by the PLC 80. Ceiling fans 55 inside the greenhouse are intended to be activated to create enough turbulence to avoid temperature and relative humidity stratification or dead zone areas.

One non-limiting example of a variable speed controller is a variable-frequency drive (VFD) 34. 39, which is a type of adjustable-speed drive used in electro-mechanical drive systems to control AC motor speed and torque by varying motor input frequency and voltage. Each controlled motor 35, 40, 55, 70 may be equipped with such a drive. AC electric motors used in a VFD system are usually, but not necessarily, three-phase induction motors. If DC motors are used, a controller that varies supply voltage, such as by varying resistance, may be used to control rate of rotation.

The invention is scalable. One or more sensors may be located in the greenhouse. One or more PLCs may control one or more portions of a large greenhouse. Each portion may include flow control elements controlled by the PLC.

Figure 2:
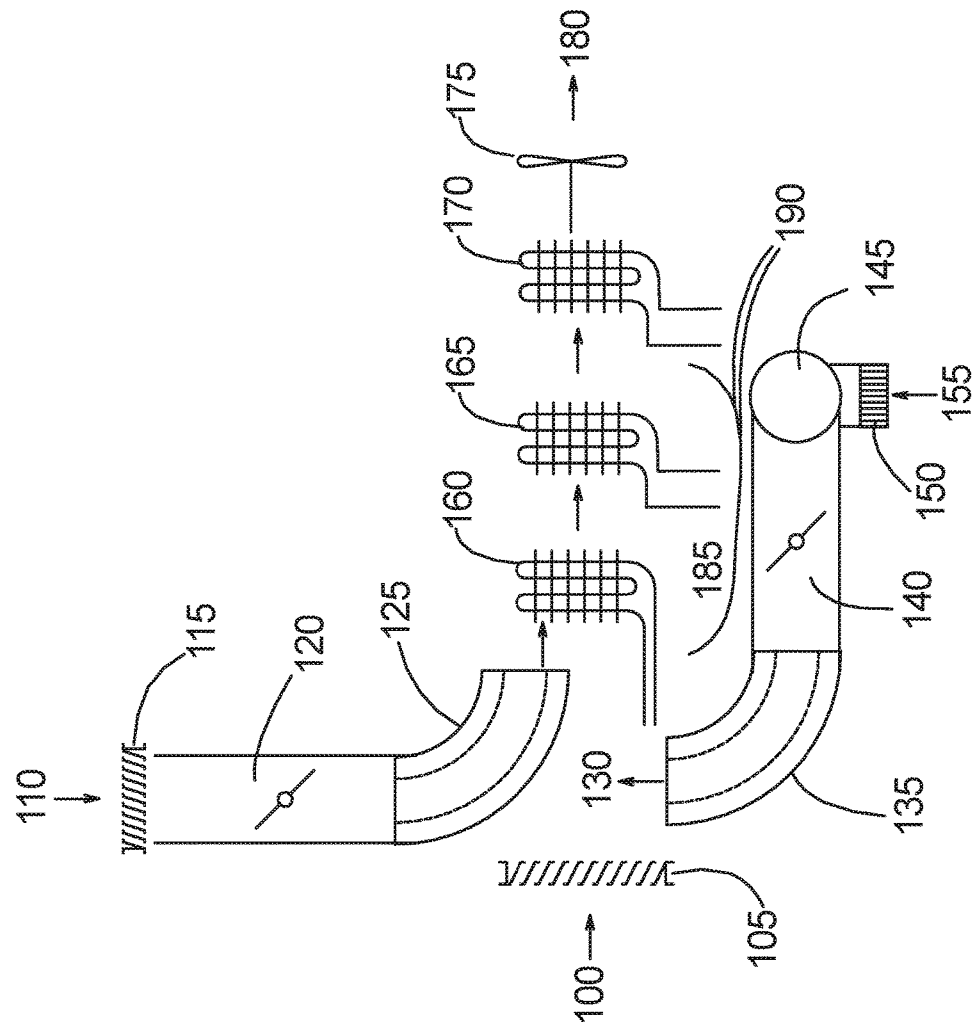
FIG. 2 is a schematic of an exemplary mixing box for a greenhouse according to principles of the invention.

With reference to FIG. 2, components of another exemplary mixing box are conceptually illustrated. Here the components include an inlet filter 105 which receives air (e.g., fresh air) from a source 100 such as an inlet duct. Another filter 115 is provided in communication with a return duct 125, which contains a damper 120. The return duct 125 returns air from the greenhouse 50. Another duct 135, controlled by a damper 140, supplies $CO_2$ or $CO_2$-containing exhaust to the mixing box. The $CO_2$-containing exhaust may optionally pass through a filter or catalytic converter 150 and fan or blower 145 en route to the duct 135. The mixing box of FIG. 2 includes two cooling coils in series 160, 165 and a heating coil 170 also in series. An outlet fan 175 produces an outlet stream 180 to the greenhouse 50. In this embodiment, a drip pan or basin 185 collects condensate from condensation at the cooling coils 160, 165. The pan or basin 185 drains into plumbing 190 that can be used to replenish water stored for cooling, heating and/or irrigation. In this manner, condensate, which can include substantial water transpired from plants, is recycled. Each embodiment of a mixing box according to principles of the invention may contain a drip pan or basin and plumbing to collect condensate for reuse.

Figure 3:
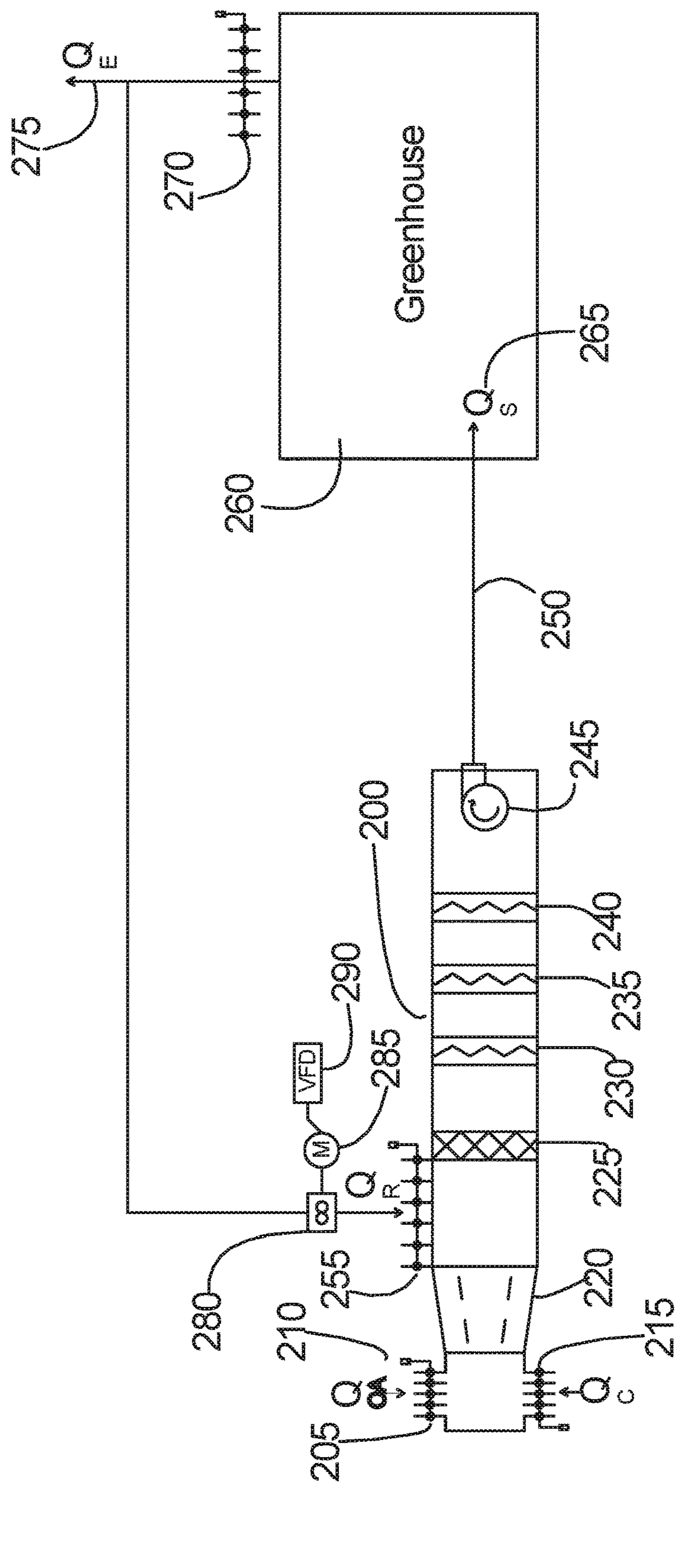
FIG. 3 is a schematic of another exemplary mixing box for a greenhouse according to principles of the invention.

With reference to FIG. 3, another exemplary mixing box 200 is conceptually illustrated. Here the mixing box 200 includes inlets which receive air (e.g., fresh outside air, $Q_{OA}$) from a source 210 such as an inlet duct with dampers 205 to control flow, $CO_2$ enriched air ($Q_C$) from another source, through another set of flow control dampers 215, and return air ($Q_R$) from conduit from an exhaust controlled by dampers 270 in the greenhouse, again through flow control dampers 255. The mixing box 200 includes a diverging channel 220 between the inlets. The combined inputs pass through a filter 225 before passing through a series of coils. The mixing box of FIG. 3 includes two cooling coils in series 230, 235 and a heating coil 240 also in series. An outlet blower 245 produces, through a conduit 250, an outlet stream ($Q_S$) 265 to the greenhouse 260. Some exhausted air may pass to the environment 275, such as if recirculation dampers 255 are closed. A motor 285, optionally with a VFD controller 290, powers a fan or blower 280 that supplies the recirculated air back to the mixing box 200.

A mixing box according to principles of the invention recovers water from transpiration. Transpiration is the loss of water from a plant in the form of water vapor. Water is absorbed by roots from the soil and transported as a liquid to the leaves via xylem. In the leaves, small pores allow water to escape as a vapor and CO2 to enter the leaf for photosynthesis. Of all the water absorbed by plants, less than 5% remains in the plant for growth and storage following growth. Thus, 95% or more of the water absorbed by plants is returned to the atmosphere. As typical greenhouse plants transpire, they may emit about 0.2 liters/plant/day to 3.0 liters/plant/day, much of which can be recycled using a mixing box according to principles of the invention.

Transpiration serves several purposes, including cooling, nutrient distribution and $CO_2$ entry. As water evaporates or converts from a liquid to a gas at the leaf cell and atmosphere interface, energy is released. This exothermic process uses energy to break the strong hydrogen bonds between liquid water molecules; the energy used to do so is taken from the leaf and given to the water molecules that have converted to highly energetic gas molecules. These gas molecules and their associated energy are released into the atmosphere, cooling the plant.

Transpiration aids nutrition. The water that enters the root contains dissolved nutrients vital to plant growth. Transpiration enhances nutrient uptake into plants.

Transpiration also enables $CO_2$ intake. When a plant transpires, its stomata are open, allowing gas exchange between the atmosphere and the leaf. Open stomata allow water vapor to leave the leaf but also allow carbon dioxide ($CO_2$) to enter. Carbon dioxide is needed for photosynthesis to operate.

Environmental conditions, including relative humidity (RH), temperature and lighting appreciably affect transpiration. Any reduction in RH creates a gradient for water to move from the leaf to the atmosphere. The lower the RH, the less moist the atmosphere and thus, the greater the driving force for transpiration. When RH is high, the atmosphere contains more moisture, reducing the driving force for transpiration.

Temperature greatly influences the magnitude of the driving force for water movement out of a plant. As temperature increases, the water holding capacity of that air increases and RH decreases. Therefore, warmer air will tend to increase the driving force for transpiration and cooler air will tend to decrease the driving force for transpiration.

Lighting conditions also affect transpiration. Stomata are pores in a leaf that allow gas exchange where water vapor leaves the plant and carbon dioxide enters. Cells called guard cells control each pore's opening or closing. When stomata are open, transpiration rates increase; when they are closed, transpiration rates decrease. Stomata are triggered to open in the light so that carbon dioxide is available for the light-dependent process of photosynthesis. Stomata are closed in the dark in most plants.

The invention regulates environmental conditions within a growing system to facilitate transpiration and optimize plant health. Relative humidity and temperature are kept within acceptable ranges. Air entering the growing system from the mixing box is enriched with $CO_2$, primarily only during daylight conditions when stomata are open and receptive to $CO_2$.

Condensation in the mixing box lowers the relative humidity of the air exiting the mixing box. Multi-stage cooling in the mixing box allows removal of substantial water vapor from the air, even after high temperature $CO_2$-containing exhaust has been introduced. Post-condensation heating of the cooled air further lowers the relative humidity. Each, in turn, facilitates transpiration.

In contrast, excessive humidity not only retards transpiration and wastes water that can otherwise be recycled, but leads to molding and other undesirable conditions. During cooler evening hours, in a conventional growing system without a mixing box according to principles of the invention, condensate may accumulate on leaves, buds and fruit. In a humid environment, evaporation is retarded. Over time, accumulated water on plants leads to mold and other undesirable conditions.

The thermodynamic process of the system is based on the predefined conditions of the psychrometric conditions of the air inside the greenhouse corresponding to the mixing box design. The mixing box is a system for providing continuous heating, cooling, and humidity control as well as controlled flow of $CO_2$, on an as needed basis, regardless of the outside environment, and based on continuous readings of the actual conditions inside the greenhouse.

During "daylight", the light sensor 64 is "on" due to either natural light entering the growing space or by a lighting system. While the light sensor 64 senses daylight conditions (i.e., natural or artificial daylight conditions), $CO_2$ is allowed to ingress. When $CO_2$ concentration in the growing space reaches a target level, the outside air is allowed to enter through the mixing box and blend in to maintain the $CO_2$ concentration in the growing space volume. During nighttime conditions, when there is little or no light inside the greenhouse, $CO_2$ injection (i.e., introduction of $CO_2$-containing exhaust) is stopped as plants "rest," with no $CO_2$ consumption expected. A mixing box according to principles of the invention thus controls $CO_2$ injection during the "light" hours to provide $CO_2$-enriched air with a $CO_2$ concentration within a desired range. If $CO_2$ concentration in a growing space exceeds a desired range (i.e., exceeds a setpoint), the PLC 80 causes the mixing box 15 to reduce or stop $CO_2$ injection. Likewise, during "night" hours, the PLC 80 causes the mixing box 15 to reduce or stop $CO_2$ injection.

An exemplary source of $CO_2$ is a natural gas fueled engine or boiler. U.S. Pat. No. 9,161,498 describes a suitable natural gas fueled generator that produces exhaust containing $CO_2$. Such a generator may be utilized to generate electricity and $CO_2$ for a growing system.

The light sensor(s) (e.g., photodetector) 64 inside the greenhouse is the primary element to deactivate/activate the injection of $CO_2$. The light sensor 64 is coupled to the controller, e.g., PLC 80. The PLC 80 uses from the light sensor 64 to determine whether to implement daylight or nighttime control of $CO_2$ injection. $CO_2$ injection is controlled by opening or closing valves or dampers that regulate flow of $CO_2$-containing exhaust into the mixing box.

Continuous measurement of temperature and RH in the growing space are provided using a thermostat 62 and humidistat 60. Several thermostats 62 and humidistats 60 may be distributed throughout the growing space to determine values within each zone, and averages and variances among zones and/or as a function of time. Ceiling fans 55 may be controlled to avoid temperature and RH concentrations by distributing air across the growing space.

By way of example and not limitation, during daytime, $CO_2$ concentration ranges between 800 ppm and 1,500 ppm in the growing space, with the ability to adjust these set points to suit variations in crops as desired. During nighttime, temperature, target RH and $CO_2$ levels will be different. These properties may for example be 60 F, 60% RH and 400 ppm of $CO_2$.

In operation, the PLC 80 causes the $CO_2$ damper 140, 215 to close during the nighttime and minimize $CO_2$ injection, and open once the lighting sensor 64 detects daylight in order to raise $CO_2$ levels as quick as possible-once $CO_2$ concentration reaches to a target level range (800-1,500 ppm), at this point, external air is allowed to enter through the mixing box. This may be accomplished by implementing a split range control. When there is light and $CO_2$ levels are low, the split range system gradually opens the $CO_2$ damper and gradually closes the damper that regulates external air entrance.

When $CO_2$ concentration reaches the maximum setpoint, the $CO_2$ level is sensed and the $CO_2$ damper is fully or partially closed while the external air damper is fully or partially opened. Any opening-closing activity may be with an overlap to avoid unstable operation.

If the temperature of the air emitted from the mixing box is at a minimum setpoint (e.g., 52° F.), valves for one or both cooling coils are adjusted to decrease cooling, and/or valves for the heating coil are fully opened to increase heating.

When air enters the mixing box, water from transpiration, now being carried by the greenhouse air, needs to be removed via condensation. The heat rejection is done through the cooling coil in order to remove the "sensible cooling" and to "de-humidify" the air as it has gained temperature and humidity inside the greenhouse. The temperature of the air circulating through the mixing box is reduced by the cooling coils 20, 25, such that moisture condensation will occur and water (i.e., condensate) is removed. The amount of water is approximately equivalent to the water from transpiration of the plants inside the greenhouse. Chilled air downstream from the cooling coils 20, 25 is suitable to be put back into the greenhouse once heated in the subsequent heating coil 30.

Cooling may be performed by circulating chilled water from a cold water source, such as an absorption chiller, via a temperature control that modulates the amount of chilled water, and based on the temperature of cooled air downstream the cooling coil. U.S. Pat. No. 9,161,498 describes a suitable absorption unit (i.e., absorption chiller) that produces chilled water. Such an absorption unit may be utilized to supply chilled water to one or both cooling coils 20, 25.

Another source of cooled liquid for the cooling coils 20, 25 is refrigerant. A refrigeration cycle system may be provided to circulate and chill refrigerant. Such a system may include a compressor for compressing and circulating a refrigerant. Compressed heated vapor refrigerant from the compressor travels through a condenser, where it is cooled and condenses into a liquid. The cooled liquid refrigerant then passes through an expansion valve where its pressure and temperature rapidly drop. The cold liquid or liquid vapor mixture travels through one or both cooling coils 20, 25 to chill the air passing through the coils. Refrigerant from the coils 20, 25 then returns to the compressor for another cycle.

By way of example and not limitation, an absorption unit (i.e., absorption chiller) supplies chilled water to cool the first cooling coil 20. A refrigeration unit may supply a cooled glycol (e.g., ethylene glycol or propylene glycol) and water solution to cool the second coil 25. Such a refrigeration unit cools a bath or tub of glycol and water solution, typically below the freezing point of water. The cooled liquid solution is pumped though a looped circuit of tubing connected to the input and output lines of the second coil 25.

In an exemplary implementation, the cooling coils 20, 25 chill the air in the mixing box to 60° F. to 40° F., preferably 58° F. to 48° F., and more preferably 55° F. to 51° F. The heating coil 30 heats the chilled air to a temperature of 70° F. to 55° F., preferably 65° F. to 58° F., and more preferably about 60° F.

During fall and winter seasons, the temperature setpoint may be set to allow for a margin of heat loss due to the temperature gradient and heat flow from the greenhouse to ambient surroundings. An increment of 10 to 20° F. in temperature set point is estimated for northern climates and modern greenhouses. Thus, warmer air entering the greenhouse from the mixing box will become cool as heat is transferred from the warmer air to the ambient environment. The actual increment may be assessed with greenhouse operation experience. The increment compensates for heat loss to the ambient (outdoor) environment.

Air coming from the mixing box is distributed, preferably evenly distributed, in the greenhouse. Distribution is gauged via measured temperature and relative humidity across the greenhouse. In order to accomplish this, temperature sensors and relative humidity sensors are placed in pre-determined locations that represent a uniform distribution. In case of maldistribution, air temperature and subsequently relative humidity can deviate from the desired set points, e.g., 75° F. and 75% RH. These sensor readings are provided to the PLC 80 for control action. The PLC performs an average and variance analysis of the temperature over the whole greenhouse to activate a temperature control logic, which allows a change of the speed of the fans drives to maintain an average equivalent to the setpoint, e.g., 75° F. If the variance of the measured temperature equals or exceeds a threshold amount, e.g. 5° F. or more, an alarm may be activated to prompt corrective actions at the specific locations of the deviation(s).

Similarly, if for any reason, the average relative humidity falls outside a setpoint range (e.g., 70% to 85%), despite the temperature average, the PLC may initiate steps for corrective action. For example, the PLC may override the speed of the fan drivers to push more air if the average relative humidity is above the RH range so it can be lowered. Alternatively, the PLC may override the speed to lower it to allow the increment of relative humidity if it is averaging too low. Similarly, if there is an appreciable variance of the measured relative humidity, an alarm may be activated to take corrective actions in the specific locations of the deviations.

When heating coil downstream temperature of the air is at 57° F., the control valve opening is at the minimum possible opening. If the heating coil downstream temperature reduces further to a temperature below 57° F., the temperature control valve completely opens to allow for maximum boiler water circulation.

The invention is not limited to use of a boiler for heated water. Engine heat may be used to heat water. In such an embodiment, a liquid coolant is circulated around a natural gas engine, where it is heated. At least some of the heated liquid may be directed through one or more valves to a line into the heating coil and a line out of the heating coil. The line out directs the liquid back to the engine for reheating. Thus, the heating coil may act as a heater core, heating the air-$CO_2$ mixture moving through the mixing box.

The heating coil downstream temperature starts rising due to circulation of boiler water. When outlet temperature of the air is at 57° F., the temperature control valve starts to open to allow heat input on the heating coil to restore air back to the temperature setpoint (60° F.).

In normal operation, temperature and relative humidity distributed in the greenhouse are measured and values are transmitted to the PLC for status monitoring.

Air coming from the mixing box is distributed evenly in the greenhouse. This is measured via temperature and relative humidity sensors across the greenhouse.

If for any reason, the average relative humidity falls outside the range of 70% to 85%, despite the temperature average, an action on the control system can override the speed of the fan drivers to push more air if the average relative humidity is above the RH range so it can be lowered, or it may override the speed to lower it to allow the increment of relative humidity if it is averaging too low. Similarly, if there is a variance of the measured relative humidity, an alarm will be activated in order to take corrective actions in the specific locations of the deviations.

Figure 4:
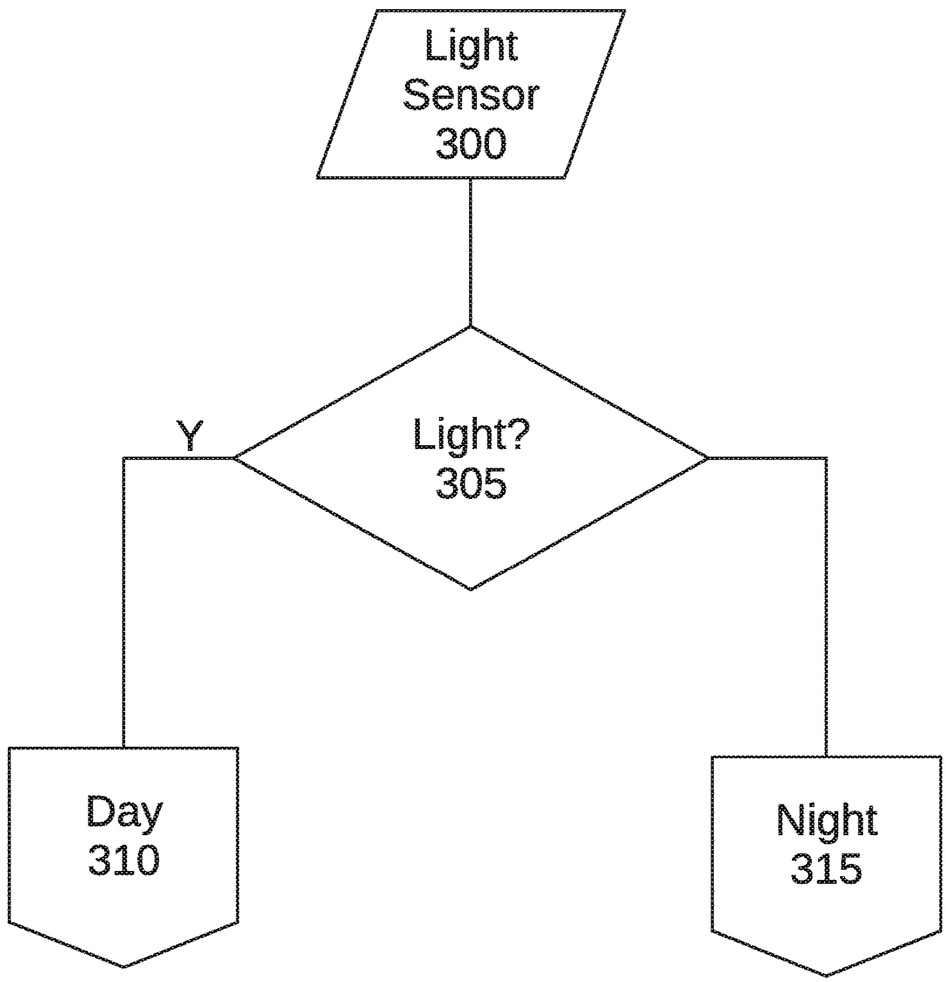
FIG. 4 is a high level flowchart of steps of determining whether to apply daylight or nighttime setpoints for controlling an exemplary mixing box for a greenhouse according to principles of the invention.

Referring now to FIG. 4, a high level flowchart illustrates logical steps performed by a PLC or similar digital controller for a mixing box according to principles of the invention. In step 300, output from one or more light sensors 64 in a growing space is sampled (received) by the PLC via an input to the PLC. Output from the light sensors may be analog or digital. If analog, an analog to digital converter, typically included in PLCs and similar digital controllers, converts the analog output to digital data for processing. If the output indicates daylight conditions, as in steps 305, 310, then processing and control proceeds according to daylight conditions. If the output indicates nighttime conditions, as in steps 305, 315, then processing and control proceeds according to nighttime conditions.

Figure 5:
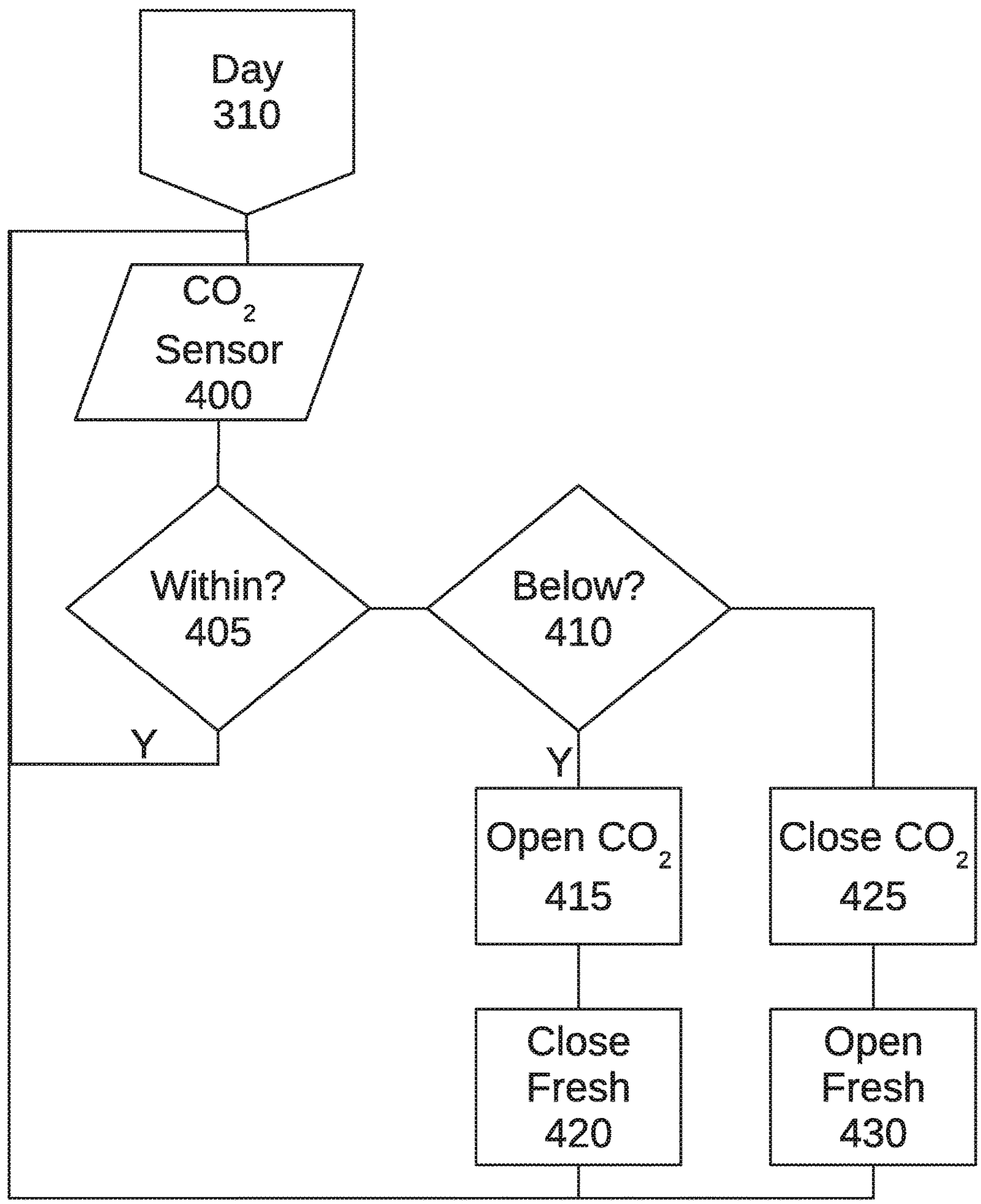
FIG. 5 is a high level flowchart of steps of controlling $CO_2$ concentration in a growing space according to a daylight setpoint using an exemplary mixing box for a greenhouse according to principles of the invention.

In FIG. 5, daylight processing of $CO_2$ sensor data is conceptually illustrated. In step 400, output from one or more $CO_2$ sensors 65 in a growing space is sampled (received) by the PLC via an input to the PLC. Output from the $CO_2$ sensors may be analog or digital. If analog, an analog to digital converter, typically included in PLCs and similar digital controllers, converts the analog output to digital data for processing. If, according to step 405, the $CO_2$ sensor data is within the setpoint range, then operating conditions may be maintained, and the sensors data will be read again subsequently for another round of evaluation. If, according to step 410, the $CO_2$ sensor data is not within the setpoint range, then operating conditions are adjusted. If $CO_2$ concentration is below a setpoint, the $CO_2$ inlet (damper) 215 is fully or partially opened to admit more $CO_2$-containing exhaust, into the mixing box, as in step 415. Concomitantly, the fresh air inlet (damper) 205 may be fully or partially closed, as in step 420. In contrast, if $CO_2$ concentration is above a setpoint, the $CO_2$ inlet (damper) 215 is fully or partially closed to admit less $CO_2$-containing exhaust, into the mixing box, as in step 425. Concomitantly, the fresh air inlet (damper) 205 may be fully or partially opened, as in step 430.

Figure 6:
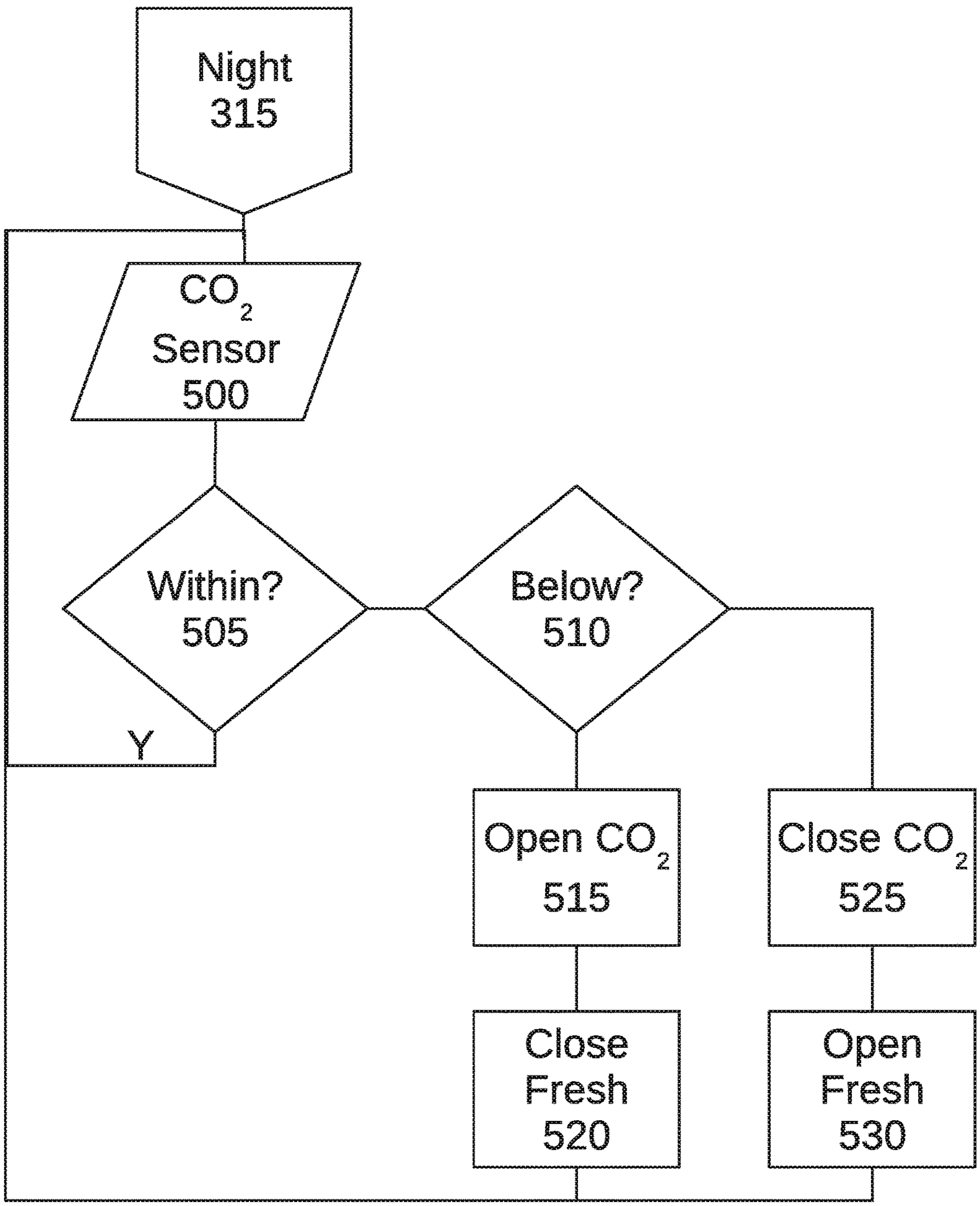
FIG. 6 is a high level flowchart of steps of controlling $CO_2$ concentration in a growing space according to a nighttime setpoint using an exemplary mixing box for a greenhouse according to principles of the invention.

Nighttime operation is very similar to daytime operation, except that the setpoint ranges are different. During nighttime, $CO_2$ setpoints are lower because there is no photosynthesis. In FIG. 6, nighttime processing of $CO_2$ sensor data is conceptually illustrated. In step 500, output from one or more $CO_2$ sensors 65 in a growing space is sampled (received) by the PLC via an input to the PLC. Output from the $CO_2$ sensors may be analog or digital. If analog, an analog to digital converter, typically included in PLCs and similar digital controllers, converts the analog output to digital data for processing. If, according to step 505, the $CO_2$ sensor data is within the setpoint range, then operating conditions may be maintained, and the sensors data will be read again subsequently for another round of evaluation. If, according to step 510, the $CO_2$ sensor data is not within the setpoint range, then operating conditions are adjusted. If $CO_2$ concentration is below a setpoint, the $CO_2$ inlet (damper) 215 is fully or partially opened to admit more $CO_2$-containing exhaust, into the mixing box, as in step 515. Concomitantly, the fresh air inlet (damper) 205 may be fully or partially closed, as in step 520. In contrast, if $CO_2$ concentration is above a setpoint, the $CO_2$ inlet (damper) 215 is fully or partially closed to admit less $CO_2$-containing exhaust, into the mixing box, as in step 525. Concomitantly, the fresh air inlet (damper) 205 may be fully or partially opened, as in step 530.

Figure 7:
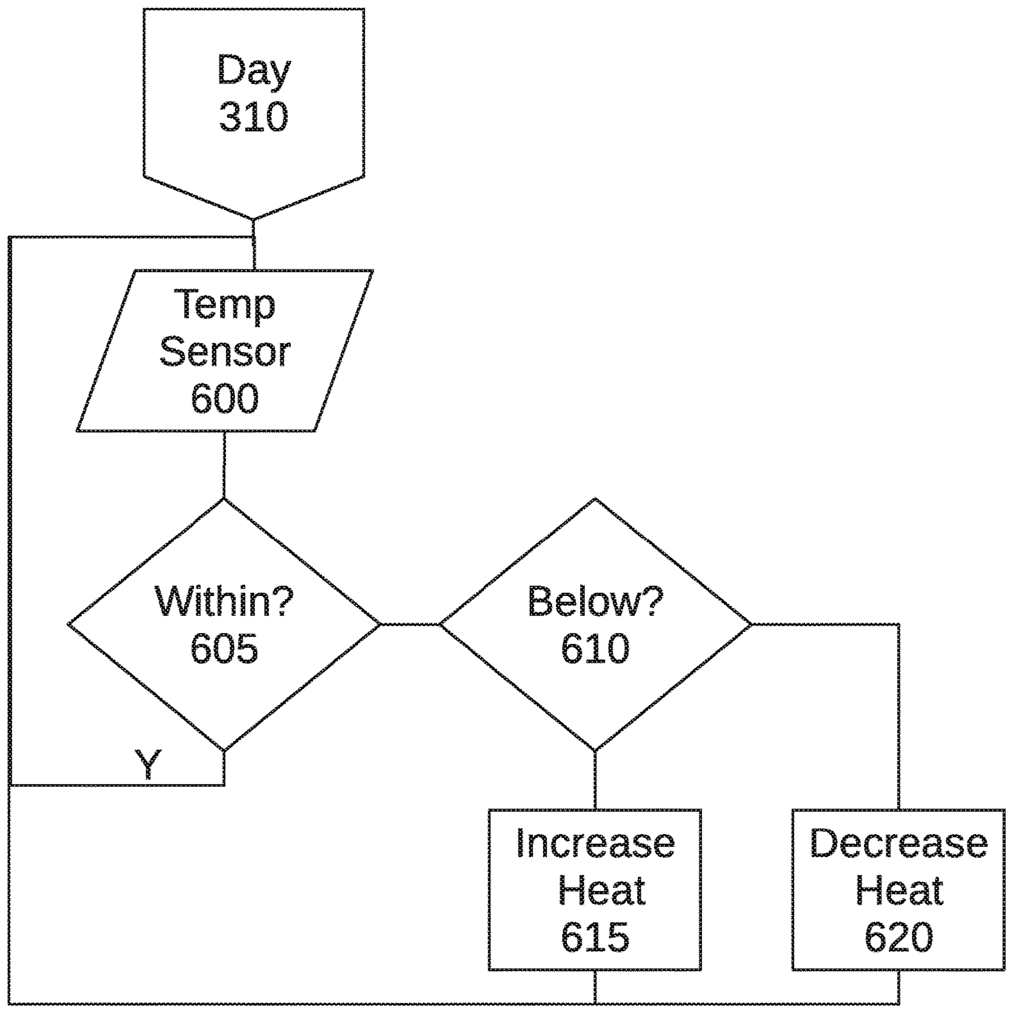
FIG. 7 is a high level flowchart of steps of controlling temperature in a growing space according to a daylight setpoint using an exemplary mixing box for a greenhouse according to principles of the invention.

The PLC performs similar processing of temperature data according to daytime and nighttime setpoints. In FIG. 7, daylight processing of temperature sensor 62 data is conceptually illustrated. In step 600, output from one or more temperature sensors 62 in a growing space is sampled (received) by the PLC via an input to the PLC. Output from the temperature sensors may be analog or digital. If analog, an analog to digital converter, typically included in PLCs and similar digital controllers, converts the analog output to digital data for processing. If, according to step 605, the temperature sensor data is within the setpoint range, then operating conditions may be maintained, and the sensors data will be read again subsequently for another round of evaluation. If, according to step 610, the temperature sensor data is not within the setpoint range, then operating conditions are adjusted. If temperature is below a setpoint, heating is increased by decreasing cooling, increasing heating and/or increasing $CO_2$-containing exhaust. Cooling may be decreased if RH is low or within a setpoint range. $CO_2$-containing exhaust may be increased if $CO_2$ concentration is low. Otherwise, heating may be increased by fully or partially opening valves to circulate more hot liquid through the heating coil lines 31, 32 and the heating coil 30 of the mixing box 15, as in step 615. If temperature is above a setpoint, heating is decreased by increasing cooling, decreasing heating and/or decreasing $CO_2$-containing exhaust. Cooling may be increased if RH is high or within a setpoint range. $CO_2$-containing exhaust may be decreased if $CO_2$ concentration is high. Otherwise, heating may be decreased by fully or partially closing valves to circulate less hot liquid through the heating coil lines 31, 32 and the heating coil 30 of the mixing box 15, as in step 620.

Figure 8:
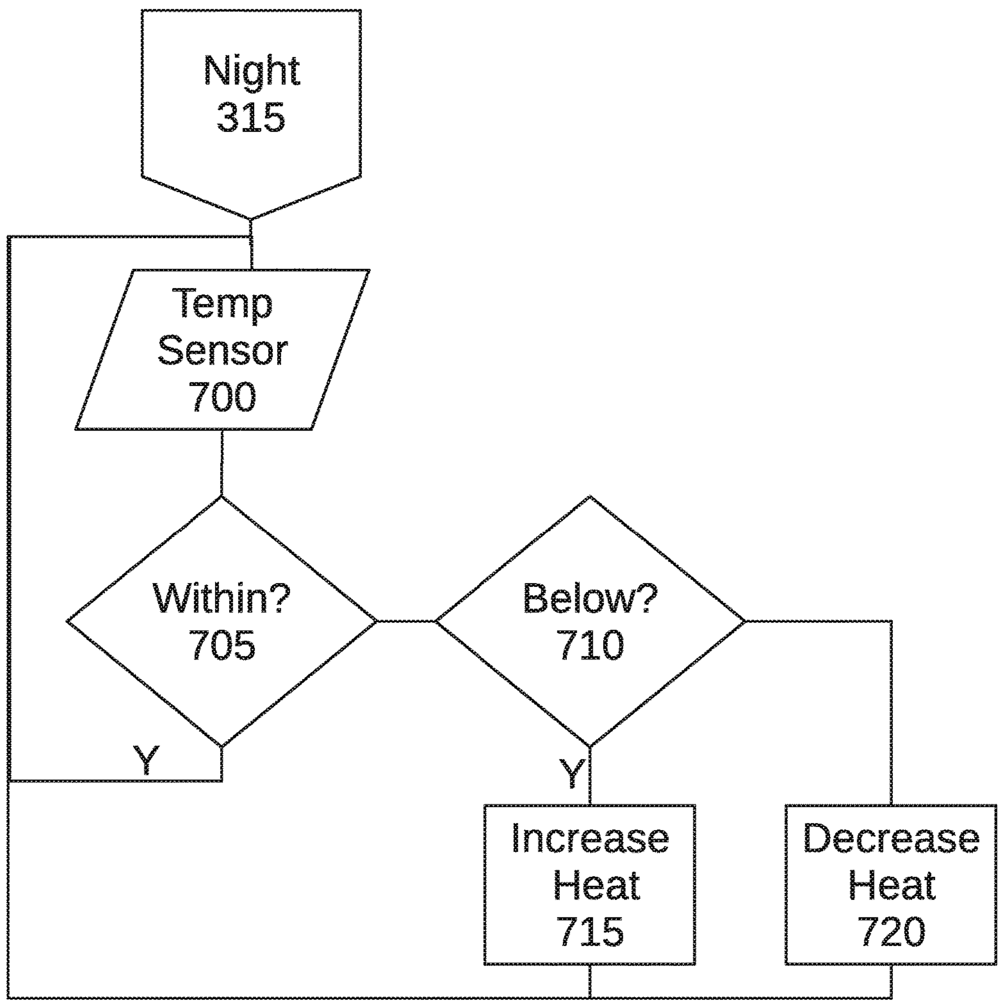
FIG. 8 is a high level flowchart of steps of controlling temperature in a growing space according to a nighttime setpoint using an exemplary mixing box for a greenhouse according to principles of the invention.

In FIG. 8, nighttime processing of temperature sensor 62 data is conceptually illustrated. A nighttime temperature setpoint may be lower than a daytime setpoint. In step 700, output from one or more temperature sensors 62 in a growing space is sampled (received) by the PLC via an input to the PLC. Output from the temperature sensors may be analog or digital. If analog, an analog to digital converter, typically included in PLCs and similar digital controllers, converts the analog output to digital data for processing. If, according to step 705, the temperature sensor data is within the setpoint range, then operating conditions may be maintained, and the sensors data will be read again subsequently for another round of evaluation. If, according to step 710, the temperature sensor data is not within the setpoint range, then operating conditions are adjusted. If temperature is below a setpoint, heating is increased by decreasing cooling, increasing heating and/or increasing $CO_2$-containing exhaust. Cooling may be decreased if RH is low or within a setpoint range. $CO_2$-containing exhaust may be increased if $CO_2$ concentration is low. Otherwise, heating may be increased by fully or partially opening valves to circulate more hot liquid through the heating coil lines 31, 32 and the heating coil 30 of the mixing box 15, as in step 715. If temperature is above a setpoint, heating is decreased by increasing cooling, decreasing heating and/or decreasing $CO_2$-containing exhaust. Cooling may be increased if RH is high or within a setpoint range. $CO_2$-containing exhaust may be decreased if $CO_2$ concentration is high. Otherwise, heating may be decreased by fully or partially closing valves to circulate less hot liquid through the heating coil lines 31, 32 and the heating coil 30 of the mixing box 15, as in step 720.

Figure 9:
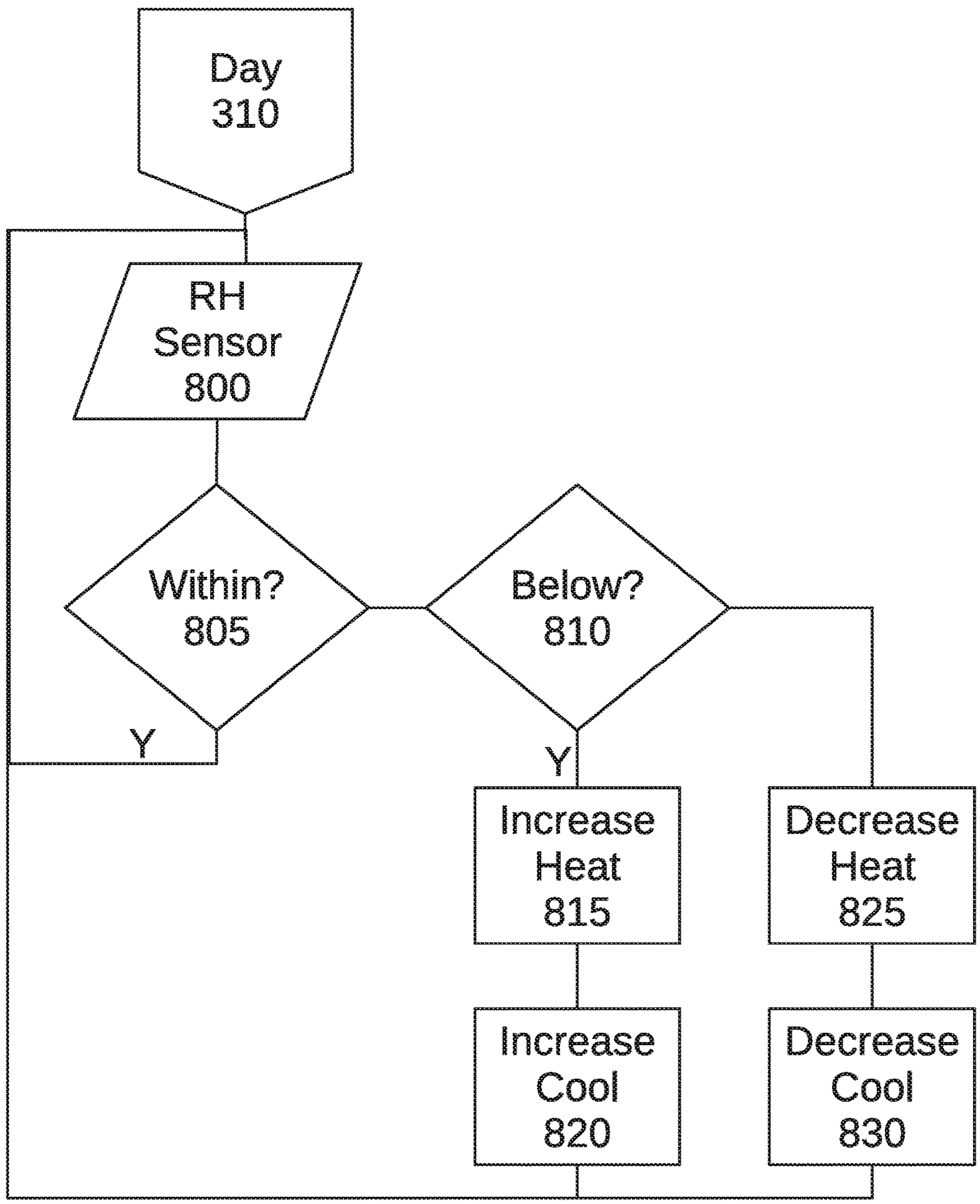
FIG. 9 is a high level flowchart of steps of controlling relative humidity in a growing space according to a daylight setpoint using an exemplary mixing box for a greenhouse according to principles of the invention.

The PLC performs similar processing of RH data according to daytime and nighttime setpoints. In FIG. 9, daylight processing of RH sensor 60 data is conceptually illustrated. In step 800, output from one or more RH sensors 60 in a growing space is sampled (received) by the PLC via an input to the PLC. Output from the RH sensors may be analog or digital. If analog, an analog to digital converter, typically included in PLCs and similar digital controllers, converts the analog output to digital data for processing. If, according to step 805, the RH sensor data is within the setpoint range, then operating conditions may be maintained, and the sensors data will be read again subsequently for another round of evaluation. If, according to step 810, the RH sensor data is not within the setpoint range, then operating conditions are adjusted. If RH is below a setpoint, heating may be increased, as in step 815, and/or cooling may be increased, as in step 820. Increasing heating increases the water vapor holding capacity of the air, and thereby reduces relative humidity. Increasing cooling enhances condensation, thereby removing more water vapor as condensate from the air. If RH is above a setpoint, heating may decreased, as in step 825, and/or cooling may be decreased, as in step 830. In creasing and decreasing of heating and/or cooling may be accomplished by opening and closing, fully or partially, valves that control flow, through lines 21-24, 31-32, of heated or cooled fluids, through coils 20, 25, 30.

Figure 10:
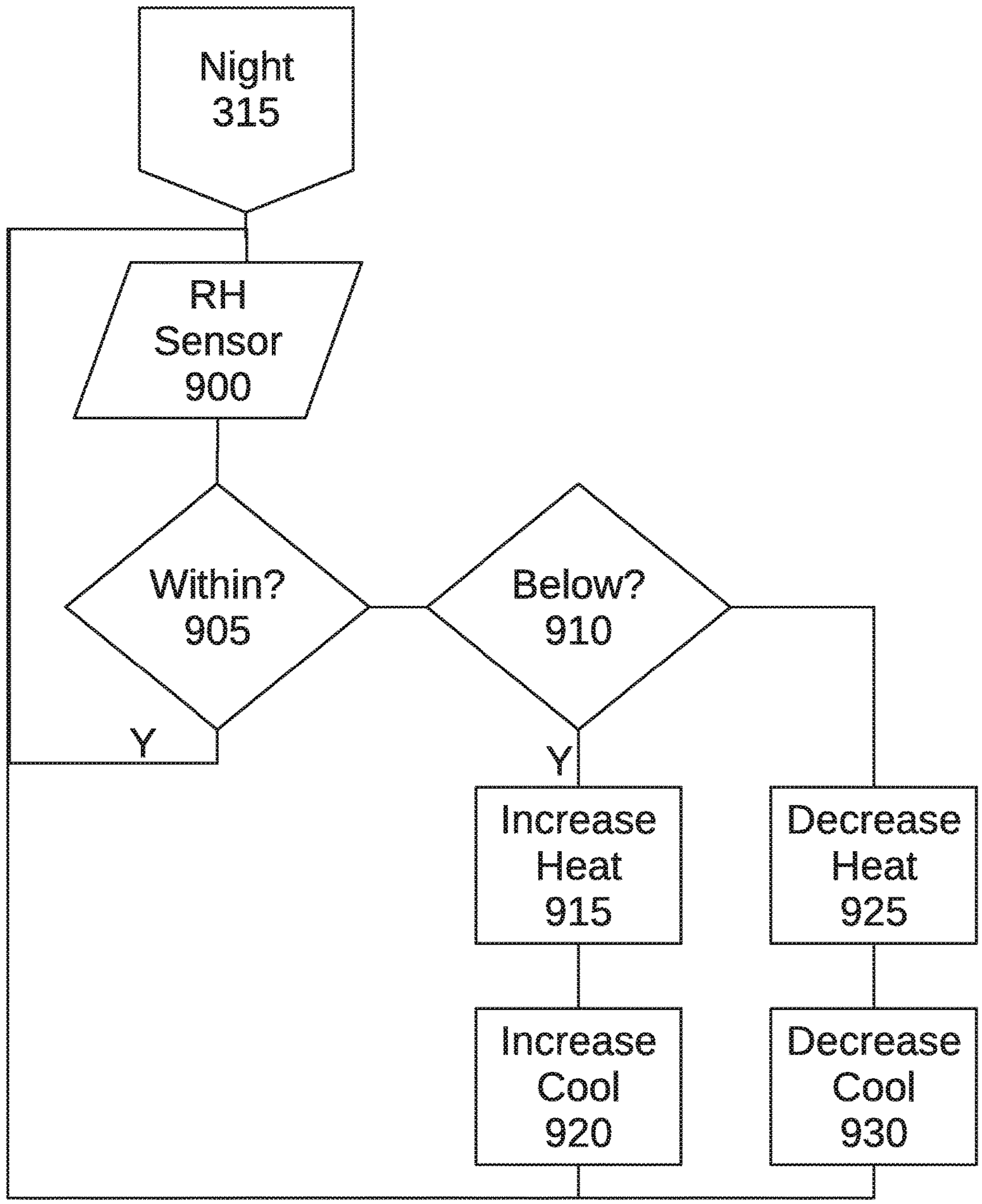
FIG. 10 is a high level flowchart of steps of controlling relative humidity in a growing space according to a nighttime setpoint using an exemplary mixing box for a greenhouse according to principles of the invention; and Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

In FIG. 10, daylight processing of RH sensor 60 data is conceptually illustrated. In step 900, output from one or more RH sensors 60 in a growing space is sampled (received) by the PLC via an input to the PLC. Output from the RH sensors may be analog or digital. If analog, an analog to digital converter, typically included in PLCs and similar digital controllers, converts the analog output to digital data for processing. If, according to step 905, the RH sensor data is within the setpoint range, then operating conditions may be maintained, and the sensors data will be read again subsequently for another round of evaluation. If, according to step 910, the RH sensor data is not within the setpoint range, then operating conditions are adjusted. If RH is below a setpoint, heating may be increased, as in step 915, and/or cooling may be increased, as in step 920. Increasing heating increases the water vapor holding capacity of the air, and thereby reduces relative humidity. Increasing cooling enhances condensation, thereby removing more water vapor as condensate from the air. If RH is above a setpoint, heating may decreased, as in step 925, and/or cooling may be decreased, as in step 930. In creasing and decreasing of heating and/or cooling may be accomplished by opening and closing, fully or partially, valves that control flow, through lines 21-24, 31-32, of heated or cooled fluids, through coils 20, 25, 30.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A growing system mixing box comprising:

a housing through which gaseous fluids flow;

a plurality of inlets to the housing, and an outlet from the housing, the outlet being spaced apart from the plurality of inlets, the plurality of inlets including a $CO_2$-containing exhaust inlet;

a cooling coil disposed between the plurality of inlets and the outlet, the cooling coil including a cooling coil inlet line and a cooling coil outlet line;

a heating coil, in series with the cooling coil, the heating coil being disposed between the cooling coil and the outlet, the heating coil includes a heating coil inlet line and a heating coil outlet line; and the cooling coil containing a chilled liquid while the heating coil contains a heated liquid.

2. The growing system mixing box of claim 1, wherein the plurality of inlets further include a fresh air inlet and a recirculation air inlet.

3. The growing system mixing box of claim 2, wherein the $CO_2$-containing exhaust inlet is fluidly coupled to one of a natural gas engine and a natural gas boiler.

4. The growing system mixing box comprising of claim 1, further comprising an absorption chiller, and the cooling coil inlet line supplying chilled liquid from the absorption chiller.

5. The growing system mixing box comprising of claim 4, wherein cooling coil outlet line returns chilled liquid from the cooling coil to the absorption chiller.

6. The growing system mixing box comprising of claim 1, wherein the heating coil includes an inlet line and an outlet line, the inlet line supplying heated liquid from a heated liquid source, and the outlet line returning heated liquid to the heated liquid source.

7. The growing system mixing box of claim 1, further comprising a drain pan disposed beneath the cooling coil, the drain pan being fluidly coupled to a drain line, the drain line being fluidly coupled to a container.

8. The growing system mixing box of claim 1, further comprising a controllable fan within the housing and a controller operably coupled to and controlling operation and volumetric flow rate of the controllable fan.

9. The growing system mixing box of claim 1, further comprising a plurality of dampers, including at least one damper controlling flow through each inlet of the plurality of inlets, the at least one damper comprising an electrically actuated damper, a controller operably coupled to and controlling operation of each of the plurality of dampers.

10. The growing system mixing box of claim 1, further comprising a plurality of valves, including at least one valve controlling flow through the cooling coil and at least one valve controlling flow through the heating coil, each valve of the plurality of valves comprising an electrically actuated valve.

11. The growing system mixing box of claim 10, further comprising a controller operably coupled to and controlling operation of each of the plurality of valves.

12. The growing system mixing box of claim 1, the chilled liquid is comprised of water.

13. The growing system mixing box of claim 1, the chilled liquid is comprised of water and a glycol from the group of ethylene glycol and propylene glycol.

14. The growing system mixing box of claim 1, the chilled liquid is comprised of a glycol from the group of ethylene glycol and propylene glycol.

15. The growing system mixing box of claim 1, wherein the plurality of inlets include a fresh air inlet, a $CO_2$-containing exhaust inlet, and a recirculation air inlet, and further comprising a growing space, the growing space containing plants, the outlet being fluidly coupled to the growing space, and the recirculation air inlet being fluidly coupled to the growing space, flow proceeding from the outlet into the growing space and into the recirculation air inlet.

16. The growing system mixing box of claim 15, further comprising a controller, and a plurality of sensors in the growing space, the plurality of sensors being operably coupled and providing input to the controller.

17. The growing system mixing box of claim 16, the plurality of sensors in the growing space including a humidity sensor, a $CO_2$ sensor, a temperature sensor and a light sensor, a plurality of setpoints stored on the controller, the plurality of setpoints including setpoints for daylight and setpoints for nighttime, daylight setpoints being applied when the light sensor senses daylight lighting conditions, and nighttime setpoints being applied when the light sensor does not sense daylight lighting conditions.

18. The growing system mixing box of claim 17, further comprising a plurality of dampers, including at least one damper controlling flow through each inlet of the plurality of inlets, the at least one damper comprising an electrically actuated damper, and the controller operably coupled to and controlling operation of each of the plurality of dampers.

19. The growing system mixing box of claim 18, further comprising a plurality of valves, including at least one valve controlling flow through cooling coil and at least one valve controlling flow through the heating coil, each valve of the plurality of valves comprising an electrically actuated valve, and the controller operably coupled to and controlling operation of each of the plurality of valves.

20. The growing system mixing box of claim 19, the plurality of setpoints including daytime and nighttime setpoints for temperature, relative humidity and $CO_2$ concentration, each of the plurality of setpoints comprising a range, and the controller controlling the plurality of valves and plurality of dampers to maintain output from each of the humidity sensor, the $CO_2$ sensor, and the temperature sensor within an applicable one of the setpoints.

* * * * *